(12) United States Patent
Hsieh et al.

(10) Patent No.: US 7,925,294 B2
(45) Date of Patent: Apr. 12, 2011

(54) MOBILE COMMUNICATION DEVICE

(75) Inventors: Kuan-Hong Hsieh, Shenzhen (CN); Xiao-Guang Li, Shenzhen (CN)

(73) Assignees: Ensky Technology (Shenzhen) Co., Ltd., Shenzhen, Guangdong Province (CN); Ensky Technology Co., Ltd., New Taipei (TW)

( * ) Notice: Subject to any disclaimer, the term of this patent is extended or adjusted under 35 U.S.C. 154(b) by 828 days.

(21) Appl. No.: 11/749,755

(22) Filed: May 17, 2007

(65) Prior Publication Data

US 2007/0280446 A1 Dec. 6, 2007

(30) Foreign Application Priority Data

Jun. 2, 2006 (CN) .......................... 2006 1 0060972

(51) Int. Cl.
*H04M 1/00* (2006.01)
*H04B 1/38* (2006.01)
(52) U.S. Cl. ..................... 455/550.1; 455/566
(58) Field of Classification Search ............... 455/550.1, 455/566
See application file for complete search history.

(56) References Cited

U.S. PATENT DOCUMENTS

| | | | | |
|---|---|---|---|---|
| 5,267,308 A * | 11/1993 | Jokinen et al. | ................ | 379/354 |
| 5,684,873 A | 11/1997 | Tiilikainen | | |
| 5,710,810 A | 1/1998 | Tiilikainen | | |
| 5,760,773 A * | 6/1998 | Berman et al. | ................ | 715/808 |
| 5,974,551 A * | 10/1999 | Lee | ................ | 713/300 |
| 6,125,287 A * | 9/2000 | Cushman et al. | ............. | 455/566 |
| 6,222,921 B1 * | 4/2001 | Mugura et al. | ................ | 379/354 |
| 6,320,943 B1 * | 11/2001 | Borland | ................... | 379/112.01 |
| 6,463,272 B1 * | 10/2002 | Wallace et al. | ............. | 455/404.2 |
| 6,670,951 B2 * | 12/2003 | Clough et al. | ................ | 345/173 |
| 6,766,017 B1 | 7/2004 | Yang | | |
| 7,068,769 B1 * | 6/2006 | Weaver et al. | ............. | 379/201.1 |
| 7,231,229 B1 * | 6/2007 | Hawkins et al. | ............... | 455/564 |
| 7,349,671 B2 * | 3/2008 | Hirai | ................ | 455/73 |
| 7,471,283 B2 * | 12/2008 | Kim et al. | ...................... | 345/173 |
| 2002/0045467 A1 * | 4/2002 | Hama | ............................ | 455/567 |
| 2002/0151334 A1 * | 10/2002 | Sharma | ........................ | 455/566 |
| 2002/0167511 A1 * | 11/2002 | Kim et al. | ..................... | 345/211 |
| 2003/0013483 A1 * | 1/2003 | Ausems et al. | ............... | 455/556 |
| 2003/0119561 A1 * | 6/2003 | Hatch et al. | ................. | 455/566 |
| 2005/0054384 A1 * | 3/2005 | Pasquale et al. | ............. | 455/566 |

(Continued)

FOREIGN PATENT DOCUMENTS

CN 1429046 A 7/2003

(Continued)

*Primary Examiner* — Lester Kincaid
*Assistant Examiner* — Nathan Mitchell
(74) *Attorney, Agent, or Firm* — Winston Hsu; Scott Margo (57) ABSTRACT

A mobile communication device is provided. The device includes a non-volatile display, a storage unit, a processing unit, and a plurality of keys. The storage unit includes a temporary storage section for storing a communication history list, which records previous communication records and frequencies of communication of each of the previous communication records. The processing unit is configured for displaying a subset the previous communication records of the communication history list obtained from the temporary storage section on the non-volatile display, before the mobile communication device enters a stand-by state from a normal state, wherein the displayed previous communication records are listed in order according to associated frequencies of communication of the previous communication records. Each of the keys corresponds to one of the displayed previous communication records, and when actuated, signals the mobile communication device to contact the one of the previous communication records correspondingly.

17 Claims, 5 Drawing Sheets

U.S. PATENT DOCUMENTS

| | | | |
|---|---|---|---|
| 2005/0054395 A1* | 3/2005 | Arbisi et al. | 455/575.3 |
| 2005/0289470 A1* | 12/2005 | Pabla et al. | 715/751 |
| 2006/0035632 A1* | 2/2006 | Sorvari et al. | 455/418 |
| 2006/0084478 A1* | 4/2006 | Erlichmen | 455/566 |
| 2006/0105753 A1* | 5/2006 | Bocking et al. | 455/417 |
| 2006/0274018 A1* | 12/2006 | Kim et al. | 345/98 |

FOREIGN PATENT DOCUMENTS

| | | |
|---|---|---|
| CN | 1606727 A | 4/2005 |
| CN | 2697720 Y | 5/2005 |
| GB | 2385692 A * | 8/2003 |

\* cited by examiner

MOBILE COMMUNICATION DEVICE

BACKGROUND

1. Technical Field

The present invention relates to a mobile communication device, and particularly to a mobile communication device capable of quickly dialing a desired telephone number in a simple and effective manner.

2. General Background

In a mobile communication device (e.g., a mobile phone), it is inefficient for a user who frequently calls a certain party to dial all the digits of that party telephone number each time a call is placed. To solve this inefficiency, mobile phones have been provided with a phone book function for storing frequently used telephone numbers for future use. When dialing a telephone number using the phone book function, the user presses a function key and a scroll key one or more times to retrieve the desired telephone number. Once the desired telephone number is retrieved, the number can be dialed automatically by means of another key entered by the user. This phone book function is useful for the purpose of dialing a telephone number that the user cannot remember correctly. However, the speed by which the number can be dialed from the start of the process is limited, since the user may need to press the scroll keys repeatedly until the desired telephone number is retrieved. In the worst case, the user may press the keys more times than the number of the digits in the telephone number.

In another approach, mobile phones have been provided with a speed dial function for registering frequently used telephone numbers in association with unique hot keys (generally digit buttons). The user can dial the registered telephone numbers by pressing the associated hot keys, but needs to remember the telephone number or party associated with the respective hot keys. Accordingly, the user typically needs to separately note the telephone numbers or parties associated with the respective hot keys, which is cumbersome. Further, when the mobile phone stores a plurality of telephone numbers, the hot keys may be limited and does not meet all the stored telephone numbers.

Another technique that has been introduced to facilitate dialing has been to equip the mobile phone with a history telephone number list and a redial key to implement a redial function. The redial key, as well known, is used to redial the last telephone number dialed. The history telephone number list has a limited storage for storing the telephone numbers communicated (e.g., dialed or answered) recently. The telephone numbers are listed according to a temporal order they have been communicated, typically, the most recent one will be listed in front of all others. Consequently, when the users want to dial a particular telephone number communicated early, they may have to spend more time retrieving the desired telephone number from the history telephone number list. In addition, some of the telephone numbers listed may repeatedly appear when they are dialed more times. As a result, some frequently telephone numbers may be replaced by the repetitive telephone numbers.

What is needed, therefore, is a mobile communication device that applies an improved dialing mechanism, so that the users can quickly and easily obtain the desired telephone number, and dial the desired telephone number in a simple and effective manner.

SUMMARY

A mobile communication device is provided. The device includes a non-volatile display, a power management unit, a storage unit, a processing unit, and a plurality of keys. The storage unit includes a temporary storage section for storing a communication history list, which records previous communication records and frequencies of communication of each of the previous communication records. Before the mobile communication device enters a stand-by state from a normal state, the processing unit displays a subset of the previous communication records of the communication history list obtained from the temporary storage section on the non-volatile display. After the previous communication records are on the non-volatile display, the processing unit signals the power management unit to power off the non-volatile display. In addition, the displayed previous communication records are listed in order according to associated frequencies of communication of the previous communication records. Each of the plurality of keys corresponds to one of the displayed previous communication records, and when actuated, signals the mobile communication device to contact the one of the previous communication records correspondingly.

Other advantages and novel features will be drawn from the following detailed description with reference to the attached drawing.

DETAILED DESCRIPTION OF THE EMBODIMENT

Figure 1:
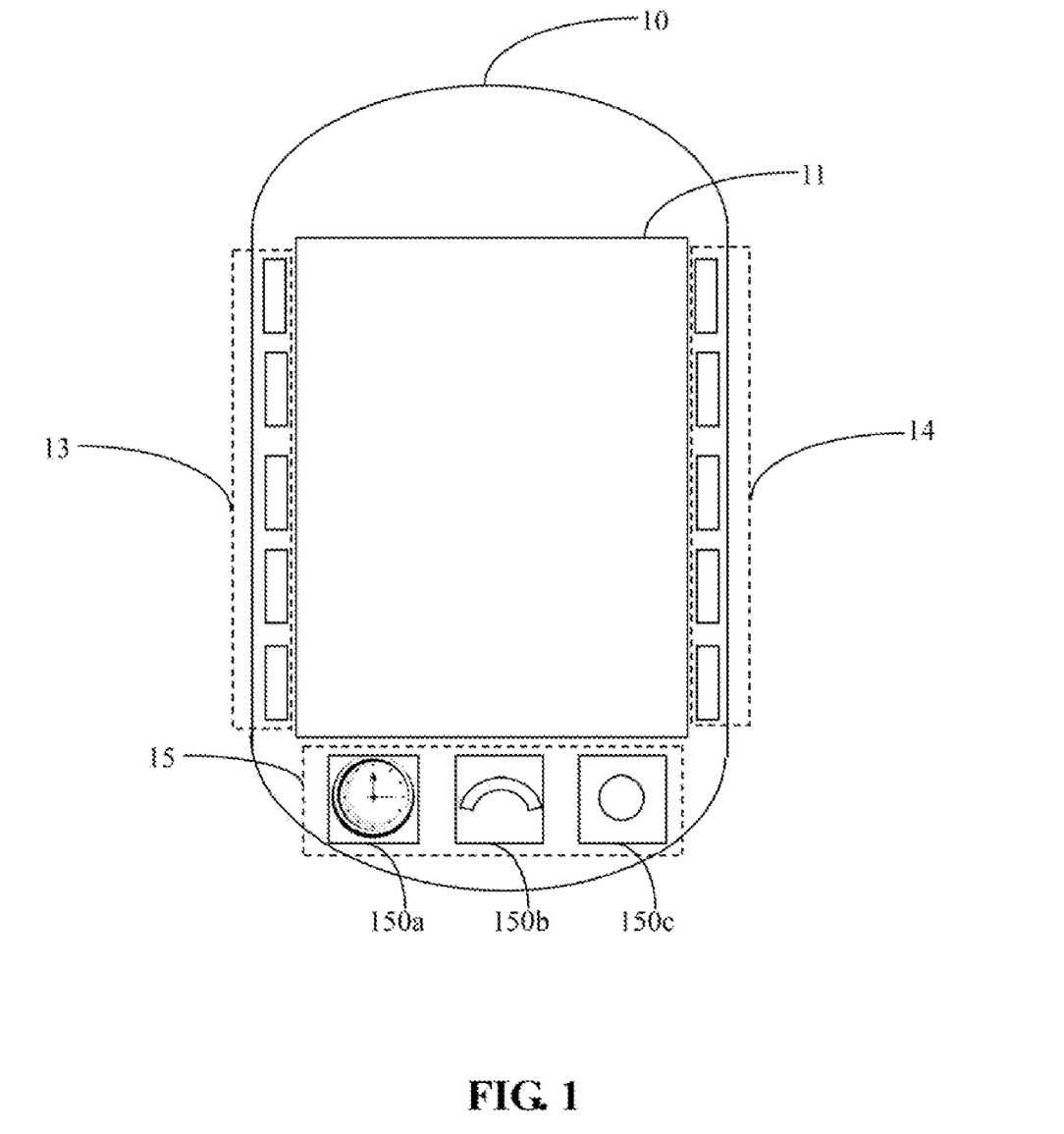
FIG. 1 is a schematic diagram of a front view of a mobile communication device in accordance with a preferred embodiment of the present invention.
Figure 2:
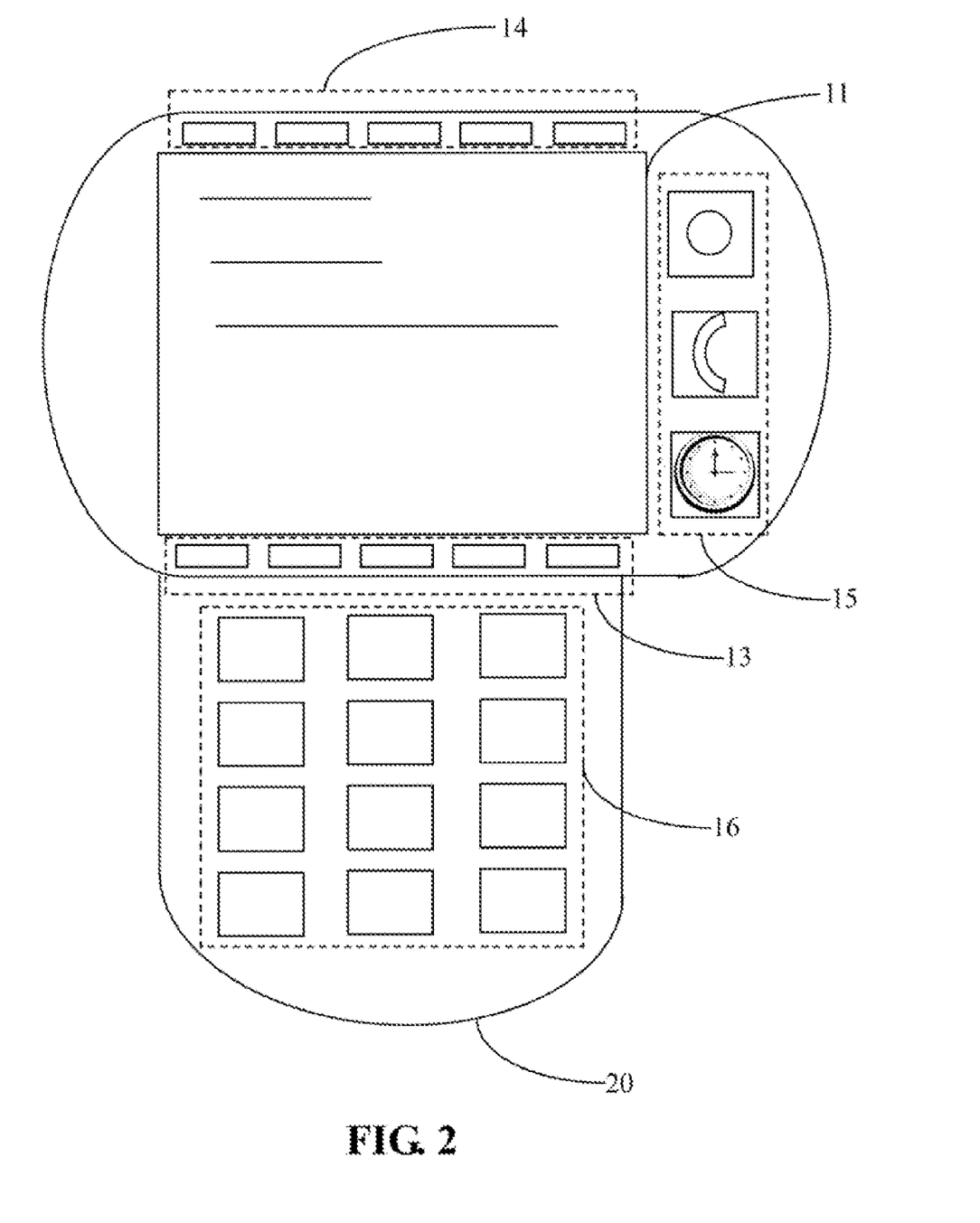
FIG. 2 is a schematic diagram showing the mobile communication device of FIG. 1 in a rotary state.

Referring to FIGS. 1 and 2, a swivel-type communication device is shown. The communication device includes a front module 10, a rear module 20, and a rotational shaft (not shown). The rotational shaft couples the front module 10 to the rear module 20 so that the front module 10 can mutually rotate thereon. The rear module 20 is configured with a keypad 16 for entering numbers or characters. The front module 10 is configured with a display 11, a first set of keys 13, a second set of keys 14, and a third set of keys 15. However, it should be noted that the present invention can be also applied to other type of communication devices, such as, for example, straight board type communication devices. In such case, the communication device only has a module equipped with the components aforementioned.

The first set of keys 13 is configured on a side outside of the display 11, and the second set of keys 14 is configured on the other side outside of the display 11 opposite to the first set of keys 13. The sets of keys 13, 14, 15 are configured to, when actuated, signal a processing unit 12 (see FIG. 3) to perform preprogrammed (predetermined) operations, e.g., communication operations, clock display operations, etc.

Figure 5:
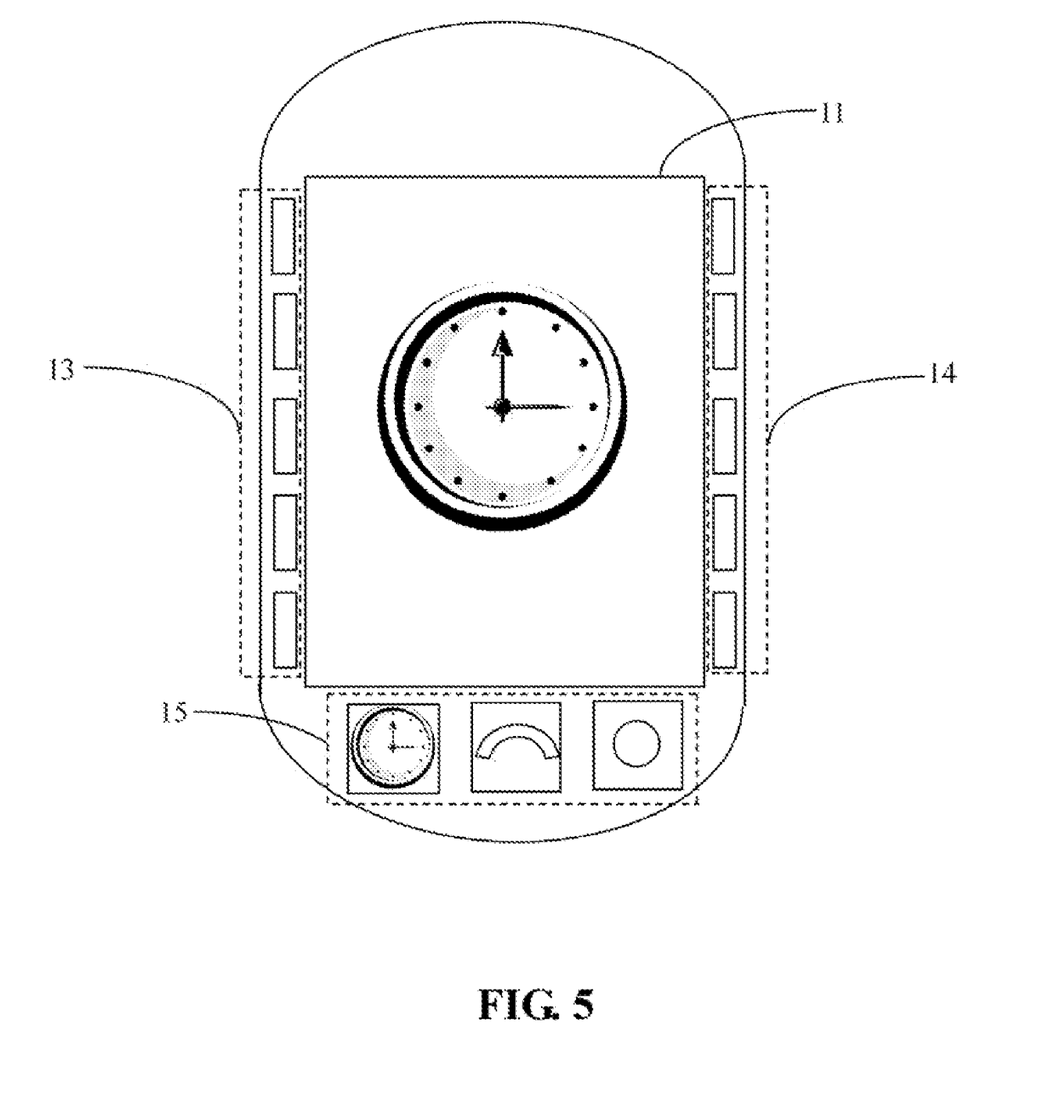
FIG. 5 is another schematic diagram showing the mobile communication device of FIG. 1 in a stand-by state.

Typically, the third set of keys 15 includes a clock function key 150a, a dial/answer function key 150b, and an end function key 150c. The clock function key 150a is used for enabling/disabling a clock display, i.e., displaying/hiding (or terminating) the clock display on the display 11. The clock display (such as that shown in FIG. 5) appears in a large size, so as to be easily and clearly readable.

Figure 3:
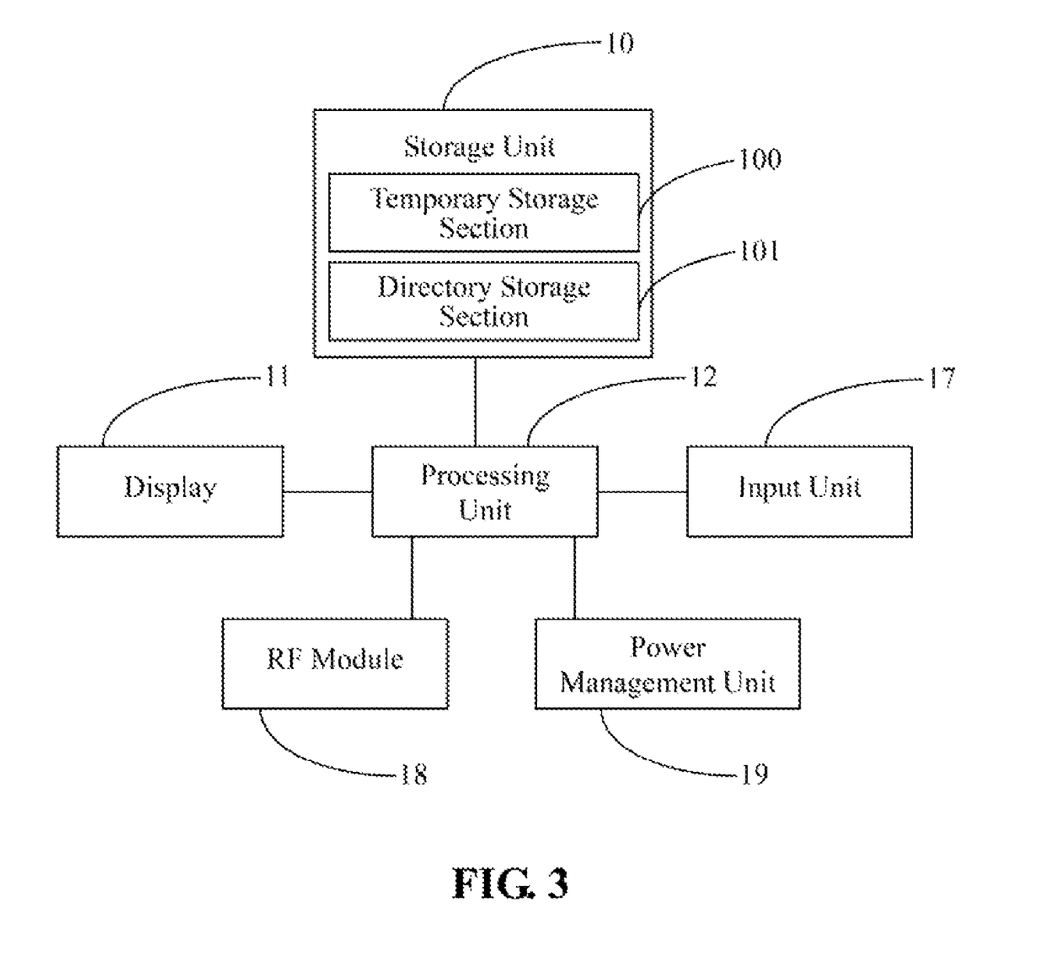
FIG. 3 is a schematic diagram of a hardware infrastructure of the mobile communication device of FIG. 1 in accordance with a preferred embodiment of the present invention.

Referring to FIG. 3, the mobile communication device includes a storage unit 10, the display 11, the processing unit 12, an input unit 17, an RF (Radio Frequency) module 18, and a power management unit 19. The power management unit 19 is configured for managing power supply from a battery (not shown). The RF module 18 is configured for modulating and converting frequency of data received from the processing unit 12 thus to obtain a radio signal, and sending the radio signal through an antenna. The RF module 12 is also configured for separating a signal received from the antenna and feeding it after frequency conversion and demodulation. The input unit 17, such as the sets of keys 13, 14, 15, and the keypad 16, is configured for operational inputs. The display 11 is a non-volatile display, such as an E-Ink (Electronic Ink) display having a property of being able to display information without power. The storage unit 10 has a temporary storage section 100 and a directory storage section 101.

The temporary storage section 100 is configured for storing a communication history list, which stores previous communication records and frequencies of communication of each of the previous communication records. Each of the previous communication records may include, for example, such as, a telephone number, a name, a time of the communication, and a communication time length. The directory storage section 101 is configured for storing a contact list that records telephone numbers and associated information e.g., names, addresses, etc.

The processing unit 12 is electrically connected with the storage unit 10, the E-ink display 11, and the power management unit 19. The processing unit 12 is configured for controlling operations of the storage unit 10, the E-ink display 11, the RF module 18, and the power management unit 19.

In a first preferred embodiment of the present invention, before the mobile communication device enters a first stand-by state from a normal state, the processing unit 12 fetches the communication history list from the temporary storage section 110, and displays a subset of the previous communication records of the obtained communication history list in a descending order on the E-ink display 11 according to the associated frequencies of communication of each of the previous communication records, then signals the power management unit 19 to power off the E-ink display 11 and other unnecessary elements of the mobile communication device, thereby the mobile communication device enters the first stand-by state.

Figure 4:
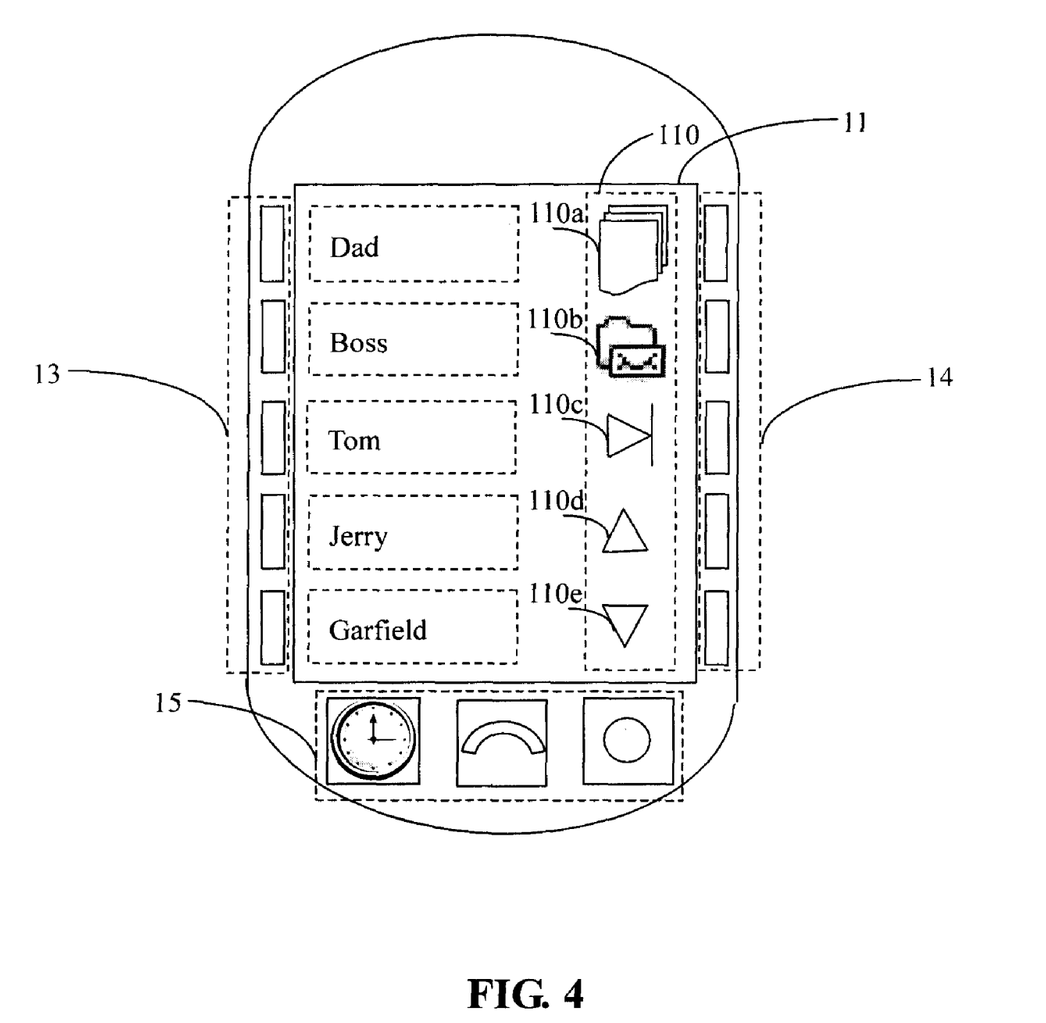
FIG. 4 is a schematic diagram showing the mobile communication device of FIG. 1 in a stand-by state.

Typically, the processing unit 12 only displays partial information of the previous communication records in the descending order on the E-ink display 11 according to the associated frequencies of communication of each of the previous communication records. For example, in the embodiment as shown in FIG. 4, the processing unit 12 only displays names of the previous communication records. With respect to the displayed information (e.g., names), they generally do not fill the entire E-ink display 11, thus, while displaying the information, the processing unit 12 displays the information on one side of the E-ink display 11. The property of the E-ink display 11 would allow the mobile communication device to readily display the previous communication records (i.e., the names of the previous communication records) communicated within a recent time period on the E-ink display 11 without consuming power.

Furthermore, the processing unit 12 also can automatically sort the previous communication records of the communication history list for a time period (e.g., morning period, afternoon period, and evening period, etc.) according to associated frequencies of communication, and thus to obtain a period communicated list corresponding to the time period. Accordingly, information displayed on the E-ink display 11 may be the period communicated list corresponding to a most recent period of the mobile communication device. Therefore, the mobile communication device can easily show regular contacts in a certain time period and can further quickly obtain communication information of desired contacts (e.g., telephone numbers, names, etc.) in the certain time period.

Referring to FIG. 4, the processing unit 12 further also displays a plurality of function icons 110 on another side of the E-ink display 11 opposite to the displayed names. A number of the function icons 110 can be different from that of the displayed names, or can be same as that of the displayed names. For example, in the embodiment as shown in FIG. 4, the number of the function icons 110 is same as that of the displayed names, and further each of the function icons 110 juxtaposes with one of the displayed names. The displayed function icons 110 may include, but not be limited to, a contact list icon 110a, a short message icon 110b, a forward icon 110c, a scroll-up icon 110d, and a scroll-down icon 110e.

The contact list icon 110a is used for performing a function of displaying the contact list obtained from the directory storage section. The short message icon 110b is used for performing a function of displaying a short message menu. The forward icon 110c is used for performing a function of displaying a next subset of the previous communication records currently displayed. The scroll-up icon 110d is used for performing a function of scrolling up the previous communication records currently displayed. The scroll-down icon 110e id used for performing a function of scrolling down the previous communication records currently displayed.

Corresponding to the displayed names and the displayed function icons 110, the mobile communication device further provides the first set of keys 13 and the second set of keys 14 to perform corresponding functions. Typically, the first set of keys 13 is configured for signaling the mobile communication device to contact the displayed names when actuated, and the second set of keys 13 is configured for performing the functions indicative of the function icons 110.

Referring to FIG. 4, each of keys of the first set of keys 13 is assigned to associate with one of the displayed previous communication records (i.e., the names of the previous communication records), and is used to directly dial the corresponding displayed name when actuated. Therefore, the mobile communication device can conveniently obtain and dial desired communication records. Particularly, the mobile communication device provides an easily comprehensible user interface that is easy to use by the elderly or children, to dial the communication record through the first set of keys 13 that is straight forward.

Similarly, each of keys of the second set of keys 14 is assigned to associate with one of the function icons 110, and is used o perform the corresponding function indicative thereof when actuated.

In a second preferred embodiment of the present invention, before the mobile communication device enters a second stand-by state from the normal state, the processing unit 12 may display other information (e.g., a clock as that shown in FIG. 5) other than the previous communication records (e.g., names) on the E-ink display 11, then signals the power management unit 16 to power off the E-ink display 11 and other necessary elements of the mobile, thereby the mobile communication device enters the second stand-by state. The mobile communication device goes out of the second stand-by state and displays information same as that described in the first stand-by state. That is, when receiving a signal generated from any of the keys of the sets of 12, 13, 14, the processing unit 12 signals the power management unit 16 to power on the elements of the mobile communication device, fetches the communication history list from the temporary storage section 110, and displays the subset of the previous communication records in the descending order on the E-ink display 11 according to the associated frequencies of communication of each of the previous communication records.

Therefore, by utilizing the mobile communication device, desired communication records can be readily obtained without hassles and time-consuming search operations, and efficiently contact the desired communication record without powering on the E-ink display 11, thereby saving power consumption of the mobile communication device.

Although the present invention has been specifically described on the basis of preferred embodiments thereof, the invention is not to be construed as being limited thereto. Various changes or modifications may be made to the embodiments without departing from the scope and spirit of the invention.

What is claimed is:

1. A mobile communication device comprising:
    a non-volatile display capable of displaying information without power;
    a power management unit;
    a storage unit comprising a temporary storage section for storing a communication history list, which records previous communication records and frequencies of communication of each of the previous communication records;
    a processing unit, configured for displaying a subset of the previous communication records of the communication history list obtained from the temporary storage section on the non-volatile display and for signaling the power management unit to power off the non-volatile display after displaying the subset of the previous communication records of the communication history list on the non-volatile display, wherein the displayed previous communication records are listed in order according to associated frequencies of communication of the previous communication records; and
    a plurality of keys, each of which corresponds to one of the displayed previous communication records, and when actuated, signals the mobile communication device to contact the one of the previous communication records correspondingly;
    wherein the processing unit further sorts the previous communication records of the communication history list during a time period according to associated frequencies of communication to obtain a period communicated list corresponding to the time period, the time period being selected from a group consisting of a morning period, an afternoon period, and an evening period.

2. The mobile communication device according to claim 1, wherein the processing unit acts to display the period communicated list corresponding to a current period on the non-volatile display, before acting to control the mobile communication device to enter into the stand-by state.

3. The mobile communication device according to claim 1, wherein the processing unit further displays a plurality of function icons on another side of the non-volatile display opposite to the previous communication records currently displayed, and the storage unit further comprises a directory storage section for storing a contact list.

4. The mobile communication device according to claim 3, wherein the function icons comprise a contact list icon, a short message icon, a forward icon, a scroll-up icon, and a scroll-down icon, the contact list icon indicating a function of displaying the contact list obtained from the directory storage section, the short message icon indicating a function of displaying a short message menu, the forward icon indicating a function of displaying a next subset of the previous communication records currently displayed, the scroll-up icon indicating a function of scrolling up the precious communication records currently displayed, and the scroll-down icon indicating a function of scrolling down the previous communication records currently displayed.

5. The mobile communication device according to claim 4, further comprising a plurality of function keys, each of which corresponds to one of the function icons, and when actuated, signals the mobile communication device to perform the function indicative of the corresponding function icon.

6. The mobile communication device according to claim 5, wherein the function keys are arranged on the other side outside of the non-volatile display opposite to the keys correspond to the displayed previous communication records.

7. The mobile communication device according to claim 1, further comprising a clock function key allowable to contact to enable/disable a clock display.

8. The mobile communication device according to claim 1, wherein the non-volatile display is an Electronic Ink (E-Ink) display.

9. A mobile communication device comprising:
    a non-volatile display capable of displaying information without power;
    a storage unit comprising a temporary storage section for storing a communication history list, which records previous communication records and frequencies of communication of each of the previous communication records;
    a processing unit, configured for displaying a subset of the previous communication records of the communication history list obtained from the temporary storage section on the display in response to a particular state of the mobile communication device, wherein the particular state is selected from a group consisting of a state when the mobile communication device enters a stand-by state and a state when the mobile communication device goes out of the stand-by state, and the displayed previous communication records are listed in order according to associated frequencies of communication of each of the previous communication records; and
    a plurality of keys, each of which corresponds to one of the displayed previous communication records, and when actuated, signals the mobile communication device to contact the one of the previous communication records correspondingly;
    wherein the processing unit further sorts the previous communication records of the communication history list during a time period according to associated frequencies of communication to obtain a period communicated list corresponding to the time period, the time period being selected from the group consisting of a morning period, an afternoon period, and an evening period.

10. The mobile communication device according to claim 9, wherein the processing unit further displays a plurality of function icons on another side of the display opposite to the previous communication records currently displayed, and the storage unit further comprises a directory storage section for storing a contact list.

11. The mobile communication device according to claim 10, wherein the function icons comprise a contact list icon, a short message icon, a forward icon, a scroll-up icon, and a scroll-down icon, the contact list icon indicating a function of displaying the contact list from the directory storage section, the short message icon indicating a function of displaying a short message menu, the forward icon indicating a function of displaying a next subset of the previous communication records currently displayed, the scroll-up icon indicating a function of scrolling up the previous communication records currently displayed, and the scroll-down icon indicating a function of scrolling down the previous communication records currently displayed.

12. The mobile communication device according to claim 11, further comprising a plurality of function keys, each of which corresponds to one of the function icons, and when actuated, signals the mobile communication device to perform the function indicative of the corresponding function icon.

13. The mobile communication device according to claim 12, wherein the function keys are arranged on the other side outside of the display opposite to the keys correspond to the displayed previous communication record.

14. The mobile communication device according to claim 1, wherein the displayed previous communication records are listed in a descending order according to the associated frequencies of communication of each of the previous communication records.

15. The mobile communication device according to claim 1, wherein the keys are arranged on a side outside of the non-volatile display.

16. The mobile communication device according to claim 9, wherein the displayed previous communication records are listed in a descending order according to the associated frequencies of communication of each of the previous communication records.

17. The mobile communication device according to claim 9, wherein the keys are arranged on one side outside of the display.

* * * * *